United States Patent
Mukira et al.

(10) Patent No.: US 6,302,649 B1
(45) Date of Patent: Oct. 16, 2001

(54) SUPERALLOY WELD COMPOSITION AND REPAIRED TURBINE ENGINE COMPONENT

(75) Inventors: Charles Gitahi Mukira, Clifton Park; Melvin Robert Jackson, Niskayuna; Aaron Todd Frost; Adrian Maurice Beltran, both of Ballston Spa, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/411,103

(22) Filed: Oct. 4, 1999

(51) Int. Cl.$^7$ ............................................. F01D 9/00
(52) U.S. Cl. .................... 415/200; 416/241 R; 428/680; 148/428; 29/889.1; 29/889.71
(58) Field of Search ................ 415/200; 416/241 R, 416/213 R; 428/680 R, 637; 148/428 R; 29/889.1, 889.71 R

(56) References Cited

U.S. PATENT DOCUMENTS

| | | |
|---|---|---|
| 3,650,734 | 3/1972 | Kantor et al. . |
| 3,668,023 | 6/1972 | Kotval . |
| 4,117,179 | * 9/1978 | Jackson et al. ....................... 427/405 |
| 4,283,234 | 8/1981 | Fukui et al. . |
| 4,750,954 | * 6/1988 | Smith, Jr. et al. ................... 148/428 |
| 5,078,963 | 1/1992 | Mallen . |

FOREIGN PATENT DOCUMENTS

| | | | |
|---|---|---|---|
| 3401711 | * | 7/1985 | (DE) . |
| 19525983 | | 2/1996 | (DE) . |
| 19536978 | | 4/1996 | (DE) . |
| 51-18210 | * | 2/1976 | (JP) . |
| 53-35620 | * | 4/1978 | (JP) . |
| 60-238442 | * | 11/1985 | (JP) . |
| 07-300643 | * | 11/1995 | (JP) . |

OTHER PUBLICATIONS

European Search Report.

* cited by examiner

Primary Examiner—Christopher Verdier
Assistant Examiner—Richard Woo
(74) Attorney, Agent, or Firm—Noreen C. Johnson; Douglas E. Stoner

(57) ABSTRACT

A solid-solution strengthened superalloy weld composition, includes:
- about 0 to about 10 wt % Co;
- about 18 to about 22 wt % Cr;
- about 0.2 to about 0.7 wt % Al;
- about 15 to about 28 wt % of the sum of refractory elements;
- up to about 0.09 wt % C;
- up to about 0.06 wt % Zr;
- up to about 0.015 wt % B;
- about 0.4 to about 1.2 wt % Mn;
- about 0.2 to about 0.45 wt % Si; and
- balance Ni.

12 Claims, 3 Drawing Sheets

SUPERALLOY WELD COMPOSITION AND REPAIRED TURBINE ENGINE COMPONENT

BACKGROUND OF THE INVENTION

The present invention is drawn to the field of turbine engine components. More particularly, the present invention is drawn to a superalloy weld composition and a repaired component utilizing a superalloy weld composition.

The efficiency of gas turbine engines is dependent in part on the amount or degree of leakage of combustion gasses between the turbine blades or buckets and the shroud of the turbine section of the engine. To minimize the gap, the tips are generally subjected to a precise machining operation. However, due to machining tolerances, thermal expansion differences between the components, and dynamic effects, typically some degree of rubbing between the tips and the shroud occurs.

Due to the rubbing contact, such as after extended service in the field, the base material of the blade is exposed, generally leading to corrosion and/or oxidation of the blade. Extended corrosion or oxidation leads to an increase in leakage between the blade and the shroud and consequent performance and efficiency losses. It has become commonplace to repair worn components as a cost-effective option to replacement, in view of the relative cost of turbine components such as blades or buckets. In a known repair technique, a weld wire formed of a weldable superalloy composition is used in a 'build-up' process to restore the blade to its original or near original geometric configuration. For example, a nickel-base superalloy weld wire can be used in a tungsten arc welding process by making multiple passes over the tip region of a nickel-base superalloy blade. Following welding, the tip region is machined.

While there are numerous commercially available weld repair alloys, there continues to be a demand for further improved weld alloys, particularly, nickel-base weld alloys for nickel-base superalloy components. In this regard, the present inventors have recognized a need for a nickel-base superalloy that has superior ductility to enable welding at room temperature (i.e., without preheating the component under repair), good oxidation resistance, and requisite high-temperature tensile strength and creep resistance.

BRIEF SUMMARY OF THE INVENTION

One embodiment of the present invention calls for a solid-solution strengthened superalloy weld composition, including:
  up to about 10 wt % Co;
  about 18 to about 22 wt % Cr;
  about 0.2 to about 0.7 wt % Al;
  about 15 to about 28 wt % of the sum of refractory elements;
  up to about 0.09 wt % C;
  up to about 0.06 wt % Zr;
  up to about 0.015 wt % B;
  about 0.4 to about 1.2 wt % Mn;
  about 0.2 to about 0.45 wt % Si; and
  balance Ni.

Another embodiment of the present invention is drawn to a repaired turbine engine component having a repaired region and an in-tact region. The repaired region has a composition as provided above.

DETAILED DESCRIPTION OF THE INVENTION

Embodiments of the present invention provide a repaired turbine engine component and a weld composition for repairing turbine engine components. The turbine engine component is typically formed of a superalloy material, known for high temperature performance in terms of tensile strength, creep resistance, oxidation resistance, and corrosion resistance, for example. The superalloy component is typically formed of a nickel-base alloy, wherein nickel is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene®80-, Rene®95, Rene® 142, and Rene®N5 alloys), and Udimet®, and include directionally solidified and single crystal superalloys.

The form of the turbine engine component varies among combustor liners, combustor domes, shrouds, buckets or blades, nozzles or vanes. The component is most typically an airfoil, including stationary airfoils such as nozzles or vanes, and rotating airfoils including blades and buckets. Blades and buckets are used herein interchangeably; typically a blade is a rotating airfoil of an aircraft turbine engine, and a bucket is a rotating airfoil of a land-based power generation turbine engine. In the case of a blade or bucket, typically the region under repair is the a tip region that is subject to wear due to rubbing contact with a surrounding shroud. In the case of a nozzle or vane, typically the area under repair is the leading edge which is subject to wear due to exposure of the highest velocity gases in the engine at elevated temperature. The repair weld composition may be used alone, as a filler material, or in combination with an insert, such as a contoured plate that is welded in place along the leading edge of a nozzle or vane.

Figure 1:
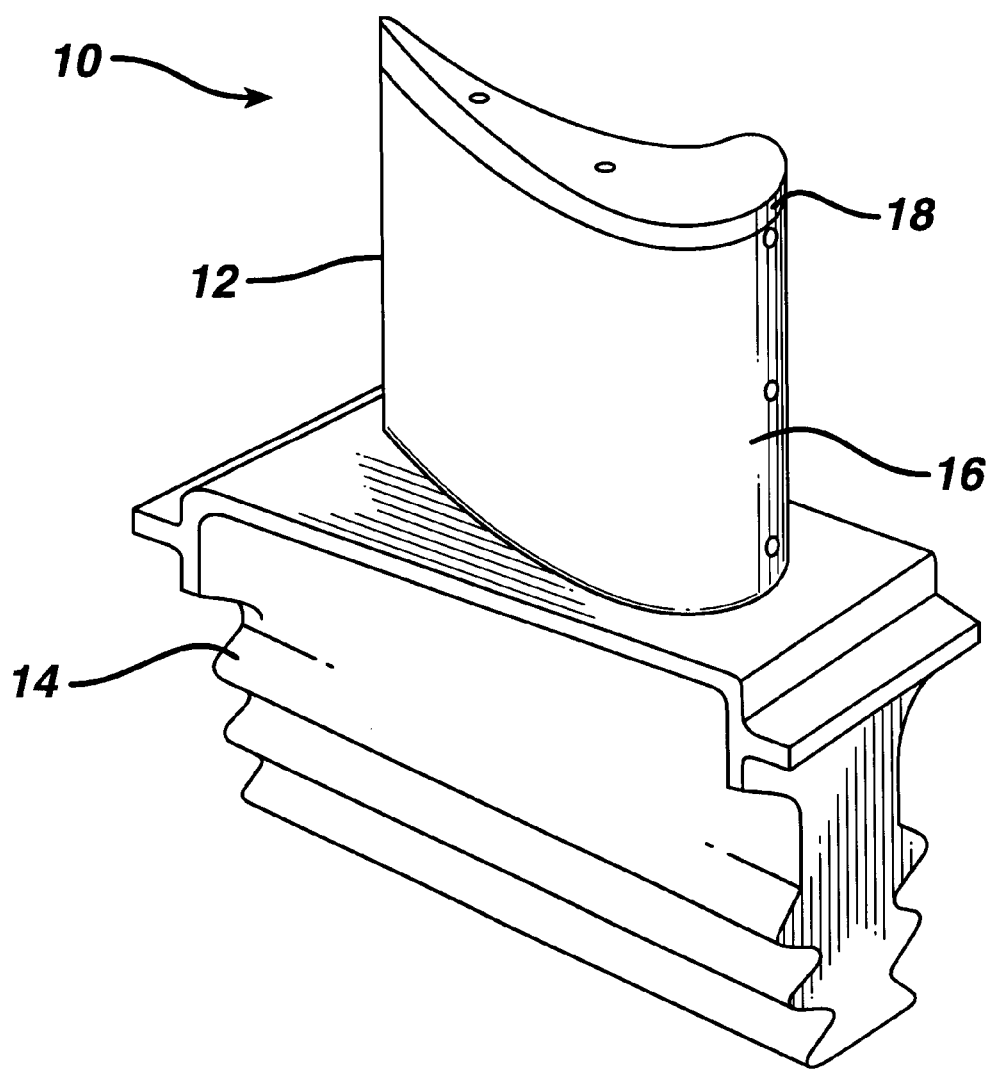
FIG. 1 is an elevated perspective view of a repaired turbine bucket of a high-pressure stage of a turbine engine.

Turning to FIG. 1, a repaired airfoil, particularly, a repaired bucket 10 of a power generation turbine engine is illustrated. The bucket 10 includes an airfoil portion 12 and dovetail portion 14. The airfoil portion 12 has in intact region 16, and a repaired region 18. Prior to repair, the bucket is removed from the turbine engine, and cleaned by a conventional process to remove deposited foreign materials as well as any oxidation and corrosion. The cleaned coating is removed from the region near the tip, and the tip is ground back to near the tip cavity and is then repaired by a welding technique. Typically tungsten arc inert gas (TIG) welding is used although other welding techniques may be employed such as gas-metal arc welding, resistance welding, electron beam welding, plasma welding, and laser welding. In the TIG welding process, heat is produced between the workpiece, e.g., the tip of bucket 10, and the tungsten electrode. A nickel-base weld wire having a composition as described herein is used as a filler metal. Multiple passes are made around the periphery of the tip thereby building up the tip to approximate the original geometry. The repair process is completed by additional machining, as well as any coating processes (e.g., overlay coatings, diffusion coatings, thermal barrier coatings) for further protection of the bucket.

According to a first embodiment of the present invention, a solid-solution strengthened weld alloy composition includes about 10 to about 15 wt % Co; about 18 to about 22 wt % Cr; about 0.5 to about 1.3 wt % Al; about 3.5 to about 4.5 wt % Ta; about 1 to about 2 wt % Mo; about 13.5 to about 17.0 wt % W; up to about 0.08 wt % C; up to about 0.06 wt %, Zr; up to about 0.015 wt % B; about 0.4 to about 1.2 wt % Mn; about 0.1 to about 0.3 wt % Si; and balance Ni. According to a particular composition, C is present in an amount not less than about 0.02 wt %, Zr is present in an amount not less than about 0.01 wt %, B is present in an amount not less than about 0.005 wt %. In a preferable form, the composition includes about 13.5 wt % Co; about 20 wt % Cr; about 0.8 wt % Al; about 4 wt % Ta; about 1.5 wt % Mo; about 15.5 wt % W; about 0.05 wt % C; about 0.03 wt % Zr; up to about 0.01 wt % B; about 0.7 wt % Mn; about 0.2 wt % Si; and balance Ni. The composition may contain typical impurities.

According to a second embodiment of the present invention, a solid-solution strengthened weld alloy composition includes up to about 10 wt % Co; about 18 to about 22 wt % Cr; about 0.2 to about 0.7 wt % Al; about 15 to about 28 wt % of the sum of refractory elements; up to about 0.09 wt % C; up to about 0.06 wt % Zr; up to about 0.015 wt % B; about 0.4 to about 1.2 wt % Mn; about 0.2 to about 0.45 wt % Si; and balance Ni. Generally, the refractory elements are chosen from the group of Ta, Mo, and W. In one example, the refractory elements include Mo and W, wherein the sum of Mo and W is within a range of about 16 to 20 wt %. In a preferable form, the refractory elements comprise only W, present in an amount of about 17 to 19 wt %. In a similar manner to the first embodiment, one particular example of the second embodiment contains C in an amount not less than about 0.02 wt %, Zr in an amount not less than about 0.01 wt %, and B in an amount not less than about 0.005 wt %. The composition may contain typical impurities.

In a particular form of the second embodiment, the composition includes about 21 wt % Cr; about 0.4 wt % Al; about 18 wt % W; about 0.07 wt % C; about 0.03 wt % Zr; up to about 0.01 wt % B; about 0.7 wt % Mn; about 0.35 wt % Si; and balance Ni. Generally, the second embodiment does not contain any lanthanum, as this element has been found to undesirably affect the properties of the alloy composition. Accordingly, the alloys of the second embodiment generally consist essentially of the above described components, free of lanthanum.

A comparison of a composition (A) according to the first embodiment of the present invention, several compositions (B–H and J–M) according to the second embodiment of the present invention, and a commercially available composition IN 625 (X) is provided below in the Table following the text of the Detailed Description. Alloys J–M differ from the compositions of B–H by further modifying the contents of Co and Mn.

Weld alloys according to embodiments of the present invention were either cast and directionally solidified (DS) into rectangular ingots having the dimensions 15 cm ×3 cm ×1 cm, or were hot extruded to rods about 2 cm in diameter.

Figure 2:
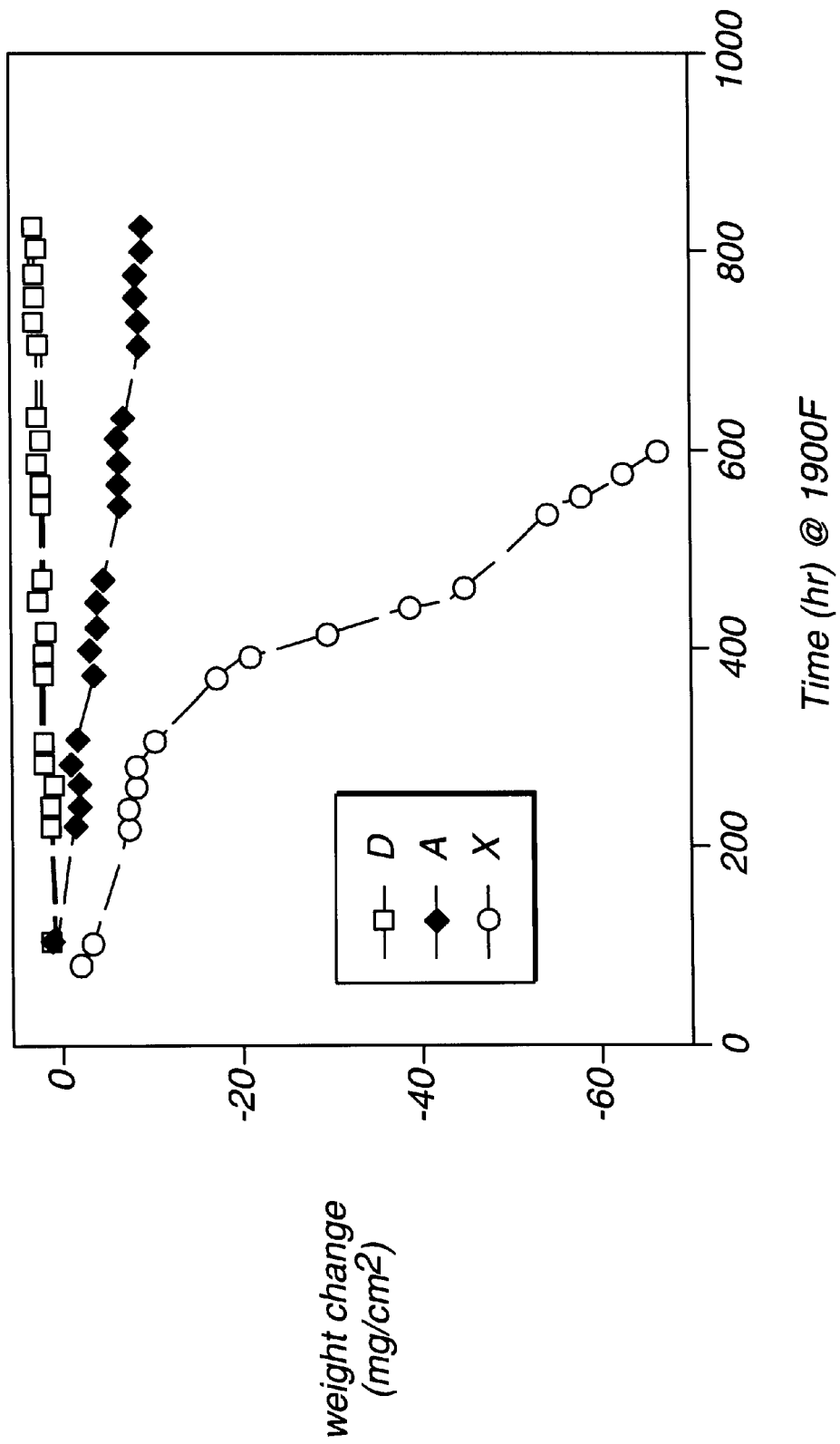
FIG. 2 is a plot representing isothermal oxidation of several alloy compositions of the present invention and a commercially available alloy, at 1900° F.
Figure 3:
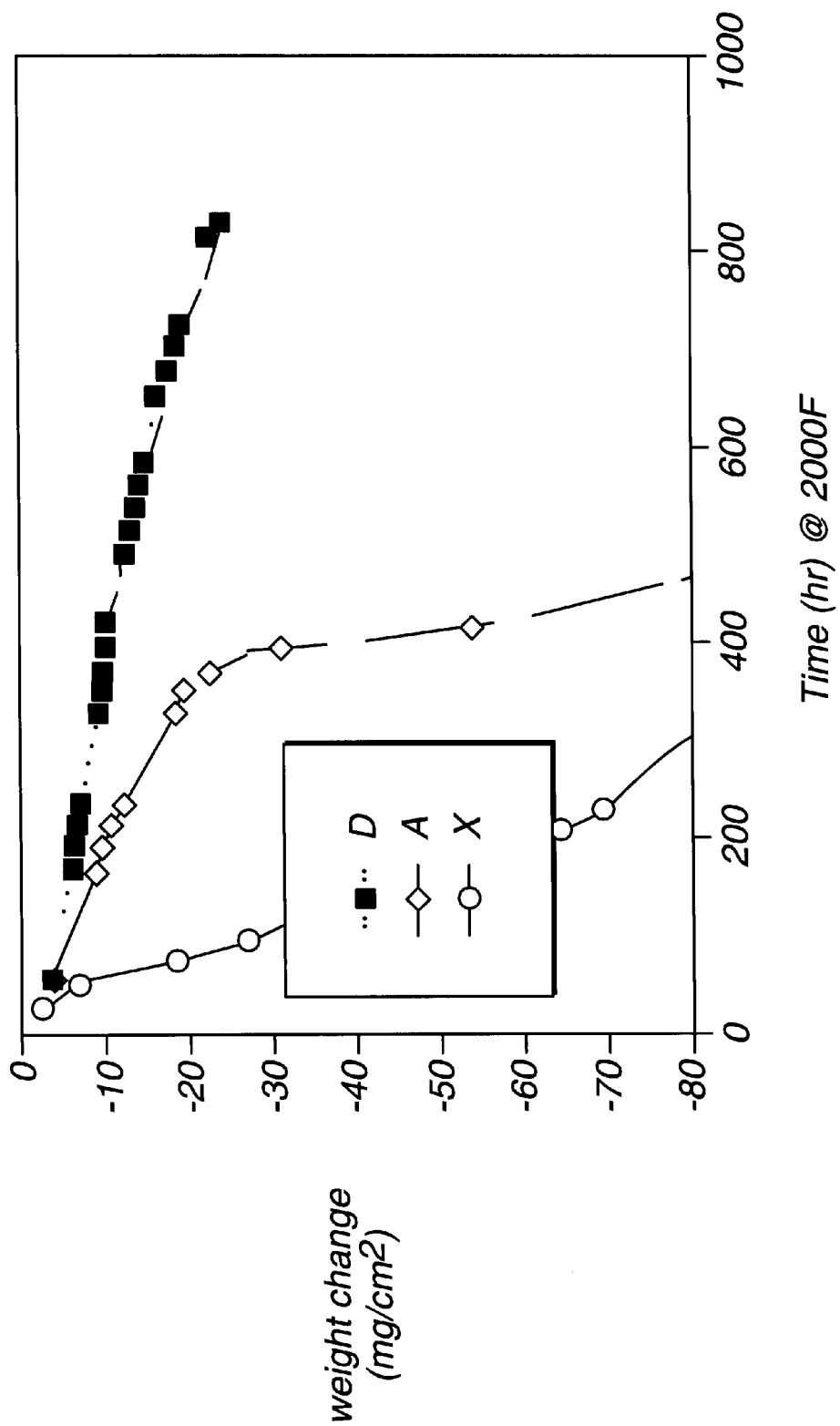
FIG. 3 is a plot representing isothermal oxidation of several alloy compositions of the present invention and a commercially available alloy, at 2000° F.

Oxidation pins were then formed by electro-discharge machining (EDM), and subjected to isothermal oxidation treatments. The results for selected alloys are shown in FIGS. 2 and 3. The y-axis, weight change, represents the extent of oxidation. Weights of the samples were measured regularly (about once/day) throughout the treatments. As clearly shown by the plots, alloys according to embodiments of the present invention showed clearly superior resistance to oxidation as compared to the commercially available alloy X. At 1900° F. for 600 hours, the alloys A and D lost less than 40 mg/cm$^2$, more particularly less than 30 mg/cm$^2$ due to oxidation. In particular, alloy D lost less than 10 mg/cm$^2$ at the same conditions.

The weld alloys were tested to evaluate rupture lives of directionally solidified specimens. Directional solidification was carried out for some alloys to eliminate the effect of differing grain structures of the specimens. Others were hot deformed to produce sound fine grained equiaxed structures. Composition A exhibited approximately a 3 improvement in rupture life over composition X at 2000° F., 3 ksi. Composition D exhibited greater than a 4 improvement in life over composition X. Similar results were also demonstrated for other alloy compositions according to embodiments of the present invention.

Some weld alloys according to embodiments of the present invention were also subjected to a butt-welding test. Here, the alloys were used as a filler material in a TIG welding process, between two nickel-base superalloy plates. Comparative testing demonstrated that alloy composition A demonstrated approximately a 30% increase in rupture life over a commercially available alloy IN 617, at 2,000° F. and 3 ksi, and a 600% increase in rupture life over IN 617 at 1900° F. and 5 ksi. Similarly, composition D demonstrated approximately a 40% increase in rupture life over alloy IN 617, at 2,000° F. and 3 ksi, and a 35% increase in rupture life over IN 617 at 1900° F. and 5 ksi. The foregoing results demonstrate that the alloys have sufficient creep rupture properties for bucket and blade tip repair applications.

Further tensile strength testing at room temperature demonstrated that the alloys have sufficient yield strength, ultimate tensile strength, and elongation properties to be readily weldable at room temperature. That is, the alloys have requisite room temperature ductility. The alloys generally had a yield strength at least about 40 ksi, and an ultimate tensile strength of at least about 75 ksi, typically at least about 80 to 90 ksi. In addition, high temperature tensile tests showed that the alloys had sufficient tensile strength for blade and bucket tip repair applications, where compositions had tensile strength on the order of 20 to 25 ksi at 1800° F.

According to embodiments of the present invention, solid solution strengthened alloy compositions have been provided that have requisite room temperature weldability, high temperature strength, high temperature creep rupture properties, and high temperature oxidation resistance. While embodiments of the present invention have been described herein with particularity, it is understood that those of ordinary skill in the art may make modifications thereto and still fall within the scope of the appended claims.

TABLE

| SAMPLE | Ni | Co | Cr | Al | Ti | Ta | Nb | Mo | W | Fe | C | Zr | B | Mn | Si |
|---|---|---|---|---|---|---|---|---|---|---|---|---|---|---|---|
| A | 43.89 | 13.55 | 19.68 | 0.83 | | 4.16 | | 1.47 | 15.50 | | 0.05 | 0.03 | 0.01 | 0.67 | 0.17 |
| B | 57.51 | 0.00 | 20.75 | 0.41 | | 6.67 | | 0.00 | 13.55 | | 0.06 | 0.03 | 0.01 | 0.67 | 0.35 |
| D | 59.06 | 0.00 | 21.05 | 0.41 | | 0.00 | | 0.00 | 18.33 | | 0.07 | 0.03 | 0.01 | 0.70 | 0.35 |
| E | 52.73 | 0.00 | 19.98 | 0.41 | | 6.42 | | 1.98 | 17.39 | | 0.06 | 0.03 | 0.01 | 0.65 | 0.35 |
| F | 57.40 | 0.00 | 20.82 | 0.42 | | 3.34 | | 1.03 | 15.85 | | 0.06 | 0.03 | 0.01 | 0.70 | 0.35 |

TABLE-continued

| SAMPLE | Ni | Co | Cr | Al | Ti | Ta | Nb | Mo | W | Fe | C | Zr | B | Mn | Si |
|---|---|---|---|---|---|---|---|---|---|---|---|---|---|---|---|
| G | 54.37 | 0.00 | 20.13 | 0.41 | | 6.47 | | 0.00 | 17.52 | | 0.06 | 0.03 | 0.01 | 0.66 | 0.35 |
| H | 55.76 | 0.00 | 20.59 | 0.41 | | 6.61 | | 2.05 | 13.44 | | 0.06 | 0.03 | 0.01 | 0.70 | 0.35 |
| X | 62.95 | | 21.50 | 0.20 | 0.20 | | 3.60 | 9.00 | | 2.50 | 0.05 | | | | |
| J | 51.09 | 9.34 | 21.60 | 0.42 | | | | | 16.03 | | 0.07 | 0.03 | 0.01 | 1.05 | 0.36 |
| K | 60.42 | 0.00 | 21.61 | 0.42 | | | | | 16.04 | | 0.07 | 0.03 | 0.01 | 1.05 | 0.36 |
| L | 51.43 | 9.34 | 21.60 | 0.42 | | | | | 16.03 | | 0.07 | 0.03 | 0.01 | 0.72 | 0.36 |
| M | 60.75 | 0.00 | 21.61 | 0.42 | | | | | 16.03 | | 0.07 | 0.03 | 0.01 | 0.72 | 0.36 |

What is claimed is:

1. A solid-solution strengthened superalloy weld composition, consisting essentially of:

up to about 10 wt % Co;

about 18 to about 22 wt % Cr;

about 0.2 to about 0.7 wt % Al;

about 15 to about 28 wt % of the sum of refractory elements;

up to about 0.09 wt % C;

up to about 0.06 wt % Zr;

up to about 0.015 wt % B;

about 0.4 to about 1.2 wt % Mn;

about 0.2 to about 0.45 wt % Si; and balance Ni and typical impurities.

2. The composition of claim 1, wherein the refractory elements comprise Ta, Mo, and W.

3. The composition of claim 1, wherein the refractory elements comprise Mo and W, wherein the sum of Mo and W is within a range of about 16 to 20 wt %.

4. The composition of claim 1, wherein the refractory elements comprise W, present in an amount of about 16 to 19 wt %.

5. The composition of claim 4, wherein C is present in an amount not less than about 0.02 wt %, Zr is present in an amount not less than about 0.01 wt %, B is present in an amount not less than about 0.005 wt %.

6. The composition of claim 5, consisting essentially of:

about 21 wt % Cr;

about 0.4 wt % Al;

about 18 wt % W;

about 0.07 wt % C;

about 0.03 wt % Zr;

up to about 0.01 wt % B;

about 0.7 wt % Mn;

about 0.35 wt % Si; and balance Ni and typical impurities.

7. A repaired turbine engine component, said component including an in-tact region and a repaired region, said repaired region consisting essentially of:

about 0 to about 10 wt % Co;

about 18 to about 22 wt % Cr;

about 0.2 to about 0.7 wt % Al;

about 15 to about 28 wt % of the sum of refractory elements;

up to about 0.09 wt % C;

up to about 0.06 wt % Zr;

up to about 0.015 wt % B;

about 0.4 to about 1.2 wt % Mn;

about 0.2 to about 0.45 wt % Si; and balance Ni and typical impurities.

8. The component of claim 7, wherein the component is an airfoil, and the repaired region is a tip of the airfoil.

9. The component of claim 8, wherein the airfoil is a bucket of a power generation turbine engine.

10. The component of claim 8, wherein the airfoil is a blade of an aircraft turbine engine.

11. The component of claim 7, wherein the component is a turbine nozzle or a turbine vane.

12. The component of claim 7, wherein the repaired region is located along a leading edge region of the nozzle or vane.

* * * * *